US011136221B2

(12) United States Patent
Korhonen et al.

(10) Patent No.: US 11,136,221 B2
(45) Date of Patent: Oct. 5, 2021

(54) RADIAL FLUX PERMANENT MAGNET ELEVATOR MOTOR

(71) Applicant: KONE Corporation, Helsinki (FI)

(72) Inventors: Tuukka Korhonen, Helsinki (FI); Mika Virnes, Helsinki (FI); Perttu Luukkonen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 409 days.

(21) Appl. No.: 16/104,002

(22) Filed: Aug. 16, 2018

(65) Prior Publication Data

US 2019/0055109 A1 Feb. 21, 2019

(30) Foreign Application Priority Data

Aug. 17, 2017 (EP) .................................... 17186607

(51) Int. Cl.
*B66B 11/04* (2006.01)
*H02K 7/10* (2006.01)
(Continued)

(52) U.S. Cl.
CPC ............ *B66B 11/0438* (2013.01); *B66B 9/00* (2013.01); *B66B 11/0045* (2013.01);
(Continued)

(58) Field of Classification Search
CPC ... B66B 11/0438; B66B 9/00; B66B 11/0045; B66B 15/04; H02K 5/24; H02K 7/08;
(Continued)

(56) References Cited

U.S. PATENT DOCUMENTS 5,783,895 A * 7/1998 Hakala ................. H02K 7/1008
187/258
10,745,246 B2 * 8/2020 Fonteneau .............. B66B 7/022
(Continued)

FOREIGN PATENT DOCUMENTS

| CN | 105836583 A | 8/2016 |
| JP | 2001-151443 A | 6/2001 |
| JP | 2001-286114 A | 10/2001 |
| KR | 10-2004-0025724 A | 3/2004 |

OTHER PUBLICATIONS

KR20040025724—Machine Translation (Year: 2004).*
Search Report issued in European priority application 17186607, dated Jan. 26, 2018.

*Primary Examiner* — Michael A Riegelman
(74) *Attorney, Agent, or Firm* — Birch, Stewart, Kolasch & Birch, LLP

(57) ABSTRACT

A radial flux permanent magnet elevator motor includes a motor frame forming the stator frame having fixing points to be fixed to an elevator guide rail, which frame has a back wall facing and/or abutting with the guide rail, which motor frame includes an axially extending flange protruding away from the back wall in the direction of the rotor, and which motor frame includes at least one axially extending first wall section in a defined radial distance from the axis of the motor frame, which first wall section is configured to support a stator winding of the motor. The rotor includes a central hub protruding into the flange of the motor frame and is rotatively supported within the flange via bearings, which rotor includes a traction sheave in a first radial distance from the motor axis and a ring-like support wall in a second radial distance from the motor axis for supporting permanent magnets, which second distance is larger than the first distance, and whereby the stator winding and the permanent magnets form a radial air gap.

20 Claims, 3 Drawing Sheets

(51) Int. Cl.
*H02K 7/08* (2006.01)
*B66B 9/00* (2006.01)
*B66B 11/00* (2006.01)
*B66B 15/04* (2006.01)
*H02K 5/24* (2006.01)
*H02K 7/102* (2006.01)
*H02K 21/22* (2006.01)

(52) U.S. Cl.
CPC ............... *B66B 15/04* (2013.01); *H02K 5/24* (2013.01); *H02K 7/08* (2013.01); *H02K 7/085* (2013.01); *H02K 7/1008* (2013.01); *H02K 7/102* (2013.01); *H02K 21/22* (2013.01)

(58) Field of Classification Search
CPC ...... H02K 7/085; H02K 7/1008; H02K 7/102; H02K 21/22
See application file for complete search history.

(56) References Cited

U.S. PATENT DOCUMENTS

| | | | |
|---|---|---|---|
| 2002/0108815 A1* | 8/2002 | Mustalahti | B66B 7/027 187/254 |
| 2003/0070881 A1* | 4/2003 | Nagata | B66B 11/0438 187/289 |
| 2004/0074703 A1* | 4/2004 | Miyoshi | B66D 5/14 187/277 |
| 2006/0060428 A1* | 3/2006 | Hashiguchi | H02K 7/102 187/254 |
| 2008/0164102 A1* | 7/2008 | Hashiguchi | H02K 7/1008 187/254 |
| 2010/0243378 A1* | 9/2010 | Begle | B66B 7/062 187/254 |
| 2012/0145489 A1* | 6/2012 | Tian | B66B 19/005 187/406 |
| 2015/0129364 A1* | 5/2015 | Roivainen | H02K 7/1008 187/250 |

* cited by examiner

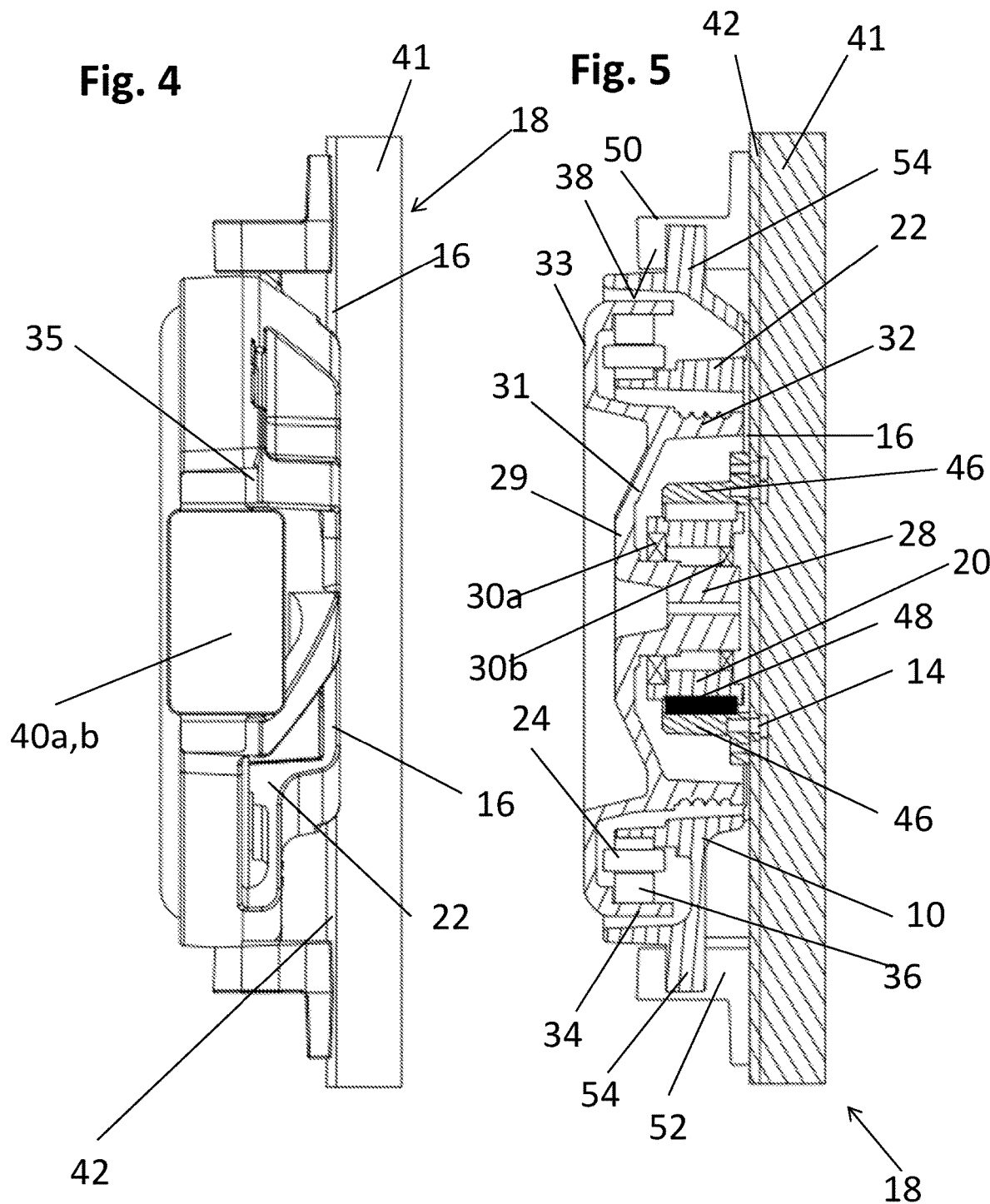

RADIAL FLUX PERMANENT MAGNET ELEVATOR MOTOR

The present invention relates to a radial flux permanent magnet elevator motor. Such kind of motor comprises a motor frame forming the stator frame having preferably fixing points to be fixed to an elevator guide rail, which motor frame has a back wall facing and/or abutting with the guide rail.

It is object of the present invention to provide a motor with a reduced depth, preferably to be located between an elevator car guide rail and a shaft wall. According to the invention, the inventive motor is characterized by the features of claim 1. Preferred embodiments of the invention are subject-matter of the dependent claims. Advantageous embodiments of the invention are further described in the descriptive part of the specification as well as in the drawings.

The motor frame comprises an inner flange protruding away from the back wall in the direction of the rotor, and which motor frame comprises at least one axially extending first wall section in a first radial distance from the axis of the motor, which wall section is configured to be connected to a stator winding. The motor further comprises a—preferably discoid—rotor comprising a hub protruding into the flange of the motor frame and being rotatively supported within the flange via bearings. The rotor comprises a traction sheave and a ring-like support wall in a second radial distance from the motor axis for supporting permanent magnets, whereby the second distance is larger than the first distance, and whereby the stator winding and the permanent magnets form a radial air gap.

Such a motor has very good efficiency and can be built very flat so as to be particularly designed for machine room-less solution where the motor is for example located between the guide rail and a shaft wall of the elevator. Furthermore, this motor layout produces a minimal electrical steel waste when being produced. Via the inventive solution, a very compact and integrated structure of motor frame and rotor is provided. This also reduces the necessary shaft space for the elevator motor.

According to the invention the radial flux permanent magnet elevator motor comprises a motor frame forming the stator frame. Preferably, the motor frame has fixing points to be fixed to an elevator guide rail or to a mounting structure fixed to the guide rail. The motor frame has a back wall facing and/or abutting with the guide rail, so that the thickness of the motor mounted to the guide rail is reduced. The motor frame comprises an axially extending flange protruding away from the back wall in the direction of the rotor. On the other hand the rotor comprises a central hub protruding into the flange of the motor frame and being rotatively supported within the flange via bearings. Thus a rigid support of the rotor on the stator which, due to the large bearing diameter between hub and flange reduces vibrations and bending forces. Preferably, the hub has a diameter of at least 5 cm, preferably at least 10 cm. Thus, the diameter of the bearing is large thus obtaining a good lever ratio of the forces acting on stator and rotor.

Further, the motor frame comprises at least one axially extending first wall section in a first radial distance from the axis of the motor frame, which first wall section is configured to support a stator winding of the motor. The first wall section can be a closed ring structure or several spaced apart cylinder sections which are configured to support the stator windings.

On the other side, the rotor comprises a traction sheave as well as a ring-like support wall in a second radial distance from the motor axis for supporting permanent magnets. The second support wall does not need to be a continuous wall abut can be formed of several spaced apart wall sectors which allow the fastening of the permanent magnets. The second distance is larger than the first distance, which means that the motor is an outer rotor motor, which leads an increased radius of torque generation to a better lever ratio of the diameter of the torque generating components (stator windings—permanent magnets) relative to the force requiring components (traction sheave). This outer rotor motor solution only necessitates less voluminous permanent magnets than in other solutions where the traction sheave diameter or the diameter of the stator windings is larger than the diameter of the permanent magnets. Thus the combination of permanent magnets and outer rotor concept with radial air gap leads to a high efficiency and increases the space savings which are already obtained by the flat overall construction.

According to a preferred embodiment of the invention, at least one, preferably all of the permanent magnets are at least partially embedded into the rotor iron of the rotor. This embedded arrangement of the permanent magnet into the rotor iron further increases the space saving and leads to a very flat motor construction with a reduced axial thickness. Preferably the permanent magnets can be fully embedded into the rotor iron of the rotor.

The stator winding and the permanent magnets form a radial air gap which leads less axial space than an axial flux motor. Thus the radial air gap forms a symbiotic combination with the outer rotor concept (force generating components having a larger radius than the force requiring components) and with the integrated mounting concept of the frame to the elevator guide rail. All these explained features lead to a reduced axial thickness while a good efficiency and a minimisation of bending forces is upheld.

According to a preferred embodiment of the invention, the motor frame as well as the rotor are each forming trough-like cavities whose openings face each other. Via this design of the stator and rotor, a very compact and integrated structure of the whole motor is obtained with reduces unused spaces within the cavity of the complete motor frame. This feature aims for a very space-saving and flat solution of an elevator motor.

Preferably, the rotor comprises an outer annular ring wall forming a brake surface for an elevator brake. Via this measure, the outer rim of the rotor simultaneously forms the brake surface for the brake pads of the machine brakes which again reduces the overall space requirement of the elevator motor, particularly in axial direction.

Generally, it is possible that the wall sections for supporting the stator winding form a closed axially extending ring wall. To provide material saving, preferably several wall sections located at the motor frame in an equidistant spacing are provided so that no continuous ring wall is necessary. These spaced apart wall sections need less material when the motor is produced. On the other hand the spaced apart wall sections form a rigid base for holding the stator windings In a preferred embodiment of the invention, the rotor comprises a first rotor portion extending radially outwards from the hub and preferably a second rotor portion which preferably extends in an angle of 10 to 45 degrees in the direction of the back wall of the motor frame and radially outwards, whereby at the outer circumference of the second rotor portion the traction sheave is located. This offers a very simple arrangement of the rotor structure with short force transmitting ways. On the other hand it can thus be achieved that the traction sheave is located in the axial area of the bearings, thus reducing bending forces in the rotor.

Preferably, in this solution, a third rotor portion extends from the traction sheave of the rotor radially outwards and preferably away from the back wall of the motor frame in an angle of 45 to 90 degrees from the radial plane, whereby an outer circumference of this third wall portion comprises an axially extending ring-like support wall carrying on its inner surface the permanent magnets and forming on its outer surface a brake surface for the motor brakes. Thus, the support wall carries on its inner side the permanent magnets whereby the outer side of this rim forms the brake surface for the elevator brake. According to a preferred embodiment, it may be provided that at least one, preferably all of the permanent magnets are at least partially embedded into an inner surface of the ring-like support wall. Preferably the permanent magnets can be fully embedded into the inner surface of the ring-like support wall. Additionally, the permanent magnets can be arranged in uniform or approximately uniform angular intervals around the motor axis in the inner surface fully circumferential of the ring-like support wall. Thus, separate components for these different functions are avoided which leads to a very compact and highly integrated overall structure of the motor.

Preferably, the inventive elevator motor has a thickness (without the traction sheave) which is 20 to 30% of its diameter. Thus, a very flat motor construction is obtained which is preferably used for machine room-less elevator solutions where space-saving has a high priority.

In a preferred embodiment of the invention, the back wall has a radially extending longitudinal recess through the axis, whereby the recess is arranged to accommodate the guide rail. This solution is very advantageous to provide a further space-saving in axial direction as now the guide rail itself forms a part of the back wall of the motor frame and the thickness of the back wall of the motor does not add up to the thickness of the corresponding member of the guide rail compared to the overall thickness of a conventional motor solution wherein the back wall would be fixed against the guide rail. Thus, this integrated and compact integrated solution of elevator guide rail and elevator motor forms an extremely flat overall construction.

Preferably the motor frame faces the rotor only from one side, i.e. from the side facing the guide rail. This reduces the overall thickness of the motor and facilitates maintenance thereof.

Preferably, the motor frame comprises an axially extended second outer wall which comprises fixing points for an elevator brake(s). Thus, the axially extending second outer wall section does on one hand cover the whole arrangement and on the other hand forms a good fastening support for the normally two elevator brakes which are to be provided for the motor according to safety regulations.

In a preferred embodiment of the invention, the flange extends 5 to 20 cm from the back wall and is thus configured to take up the hub of the rotor preferably with at least two axially spaced apart bearings.

Preferably, the hub of the rotor is massive so that it withstands high torsions and bending forces.

Preferably, the motor frame and the rotor are made from metal. If weight should be saved, also light weight metal as aluminium or titan may be used for the motor construction.

Preferably, the hub of the rotor is born within the flange of the motor frame with at least two axially spaced apart bearings which because of this spacing are configured to take up higher bending forces. Further the traction sheave may be located at least with its major part within the radial planes formed by the two bearings. Of course, more than two bearings may be used, if necessary.

The invention further relates to an elevator having a motor of the above-mentioned construction. This elevator has further elevator guide rails for guiding the elevator car and/or the counterweight up and down a traveling path. The elevator motor is mounted to the car guide rail or the counterweight guide rail. As normally the car guide rail is more rigid, the car guide rails are preferred for mounting the elevator motor. It is to be mentioned that the elevator is a traction sheave elevator. Preferably, the elevator is a machine room-less elevator as the integrated guide rail and machine construction has a very low thickness so that the distance between the elevator guide rail and the shaft wall where the motor is located can be very narrow.

Preferably, the motor of the elevator is mounted to the guide rail with a mounting flange which on one hand is fastened to the guide rail and on the other hand is fixed to the flange of the motor frame, preferably via noise-insulating elements. This has the advantage that the motor is supported at its centre, i.e. at its flange directly to the guide rail. This leads to simple a vertical force transmission arrangement, avoiding bending moments in the motor structures as well as in the guide rail.

Preferably, the mounting flange, the flange, the traction sheave as well as the stator winding and the permanent magnets are located in a common vertical plane. In this case all force suspending, generating and transmitting components are vertically aligned which reduces force transmission ways and aligns them vertically avoiding bending moments in the motor components and guide rail. Thus, a very rigid structure of the guide rail and motor is obtained.

Preferably, the elevator has a counterweight so that the roping between the elevator car and the counterweight runs around the traction sheave of the elevator motor. The elevator car and the counterweight may be suspended in a 2:1 suspension ratio which further reduces the torque requirement for the elevator motor, beside of the outer rotor concept. Of course, if a high car velocity should be obtained, also a 1:1 suspension ratio can be used for the elevator car and the counterweight.

Preferably, the magnetic circuit of the motor includes besides permanent magnets and stator windings also ferromagnetic material, e.g. iron and/or electrical steel sheets?

Following terms are used as a synonym: machine—motor;

The invention is now described by means of an embodiment in connection with the enclosed drawings.

FIG. 4 shows a side view of the motor of FIG. 1, and

FIG. 5 shows a vertical section through the center of the motor of FIG. 1.

Figure 1:
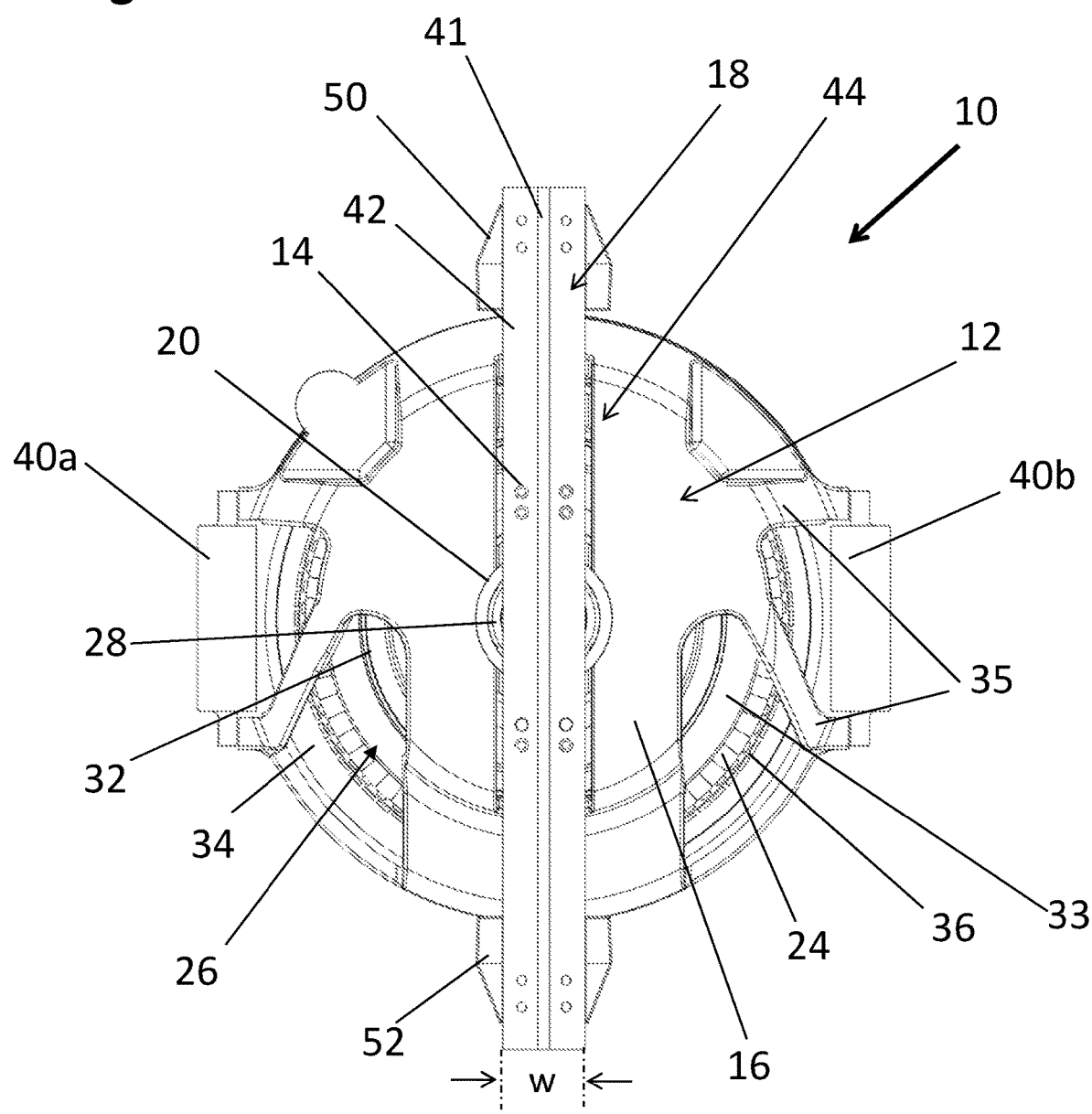
FIG. 1 shows a side view from the elevator guide rail.
Figure 2:
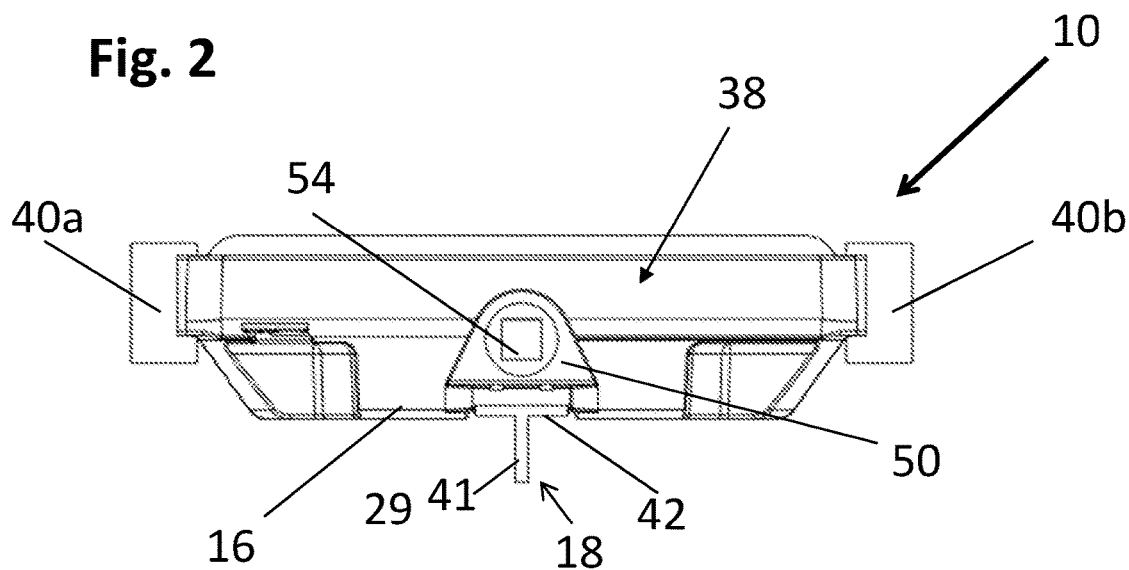
FIG. 2 shows a top view of FIG. 1.

FIG. 1 shows an elevator motor 10 comprising a motor frame 12 which is fixed via balls 14 to a guide rail 18 of an elevator.

The motor frame 12 comprises a back wall 16 having in its center a ring-like flange 20 for taking up a rotor. Further, the motor frame 12 comprises several spaced apart first wall sections 22 which are configured to support at least one stator winding 24. The motor 10 further comprises a rotor 26 having an axial central hub 28 which is supported on bearings 30*a*, 30*b* against the flange 20 of the motor frame 12. The hub 28 is connected to a radially extending first rotor portion 29 which is at its outer circumference connected to a slightly inclined second rotor portion 31. At the outer circumference of the second rotor portion 31 the traction sheave 32 is extending in the direction of the back wall 16. The first rotor portion 29, the second rotor portion 31 as well as the traction sheave 32 may be made of separate parts but preferably are a forming a one piece part preferably made of metal. At the outer edge of the traction sheave 32 opposing the back wall 16, a third rotor portion 33 protrudes axially away from the back wall 16 and radially outwards. This this rotor portion 33 carries at its outside a ring-like support wall 34 which carries at its inner surface 37 the permanent magnets 36 of the elevator motor. The permanent magnets 36 can be embedded into the inner surface 37 of the ring-like support wall 34. Thus, the stator windings 24 and the permanent magnets 36 are forming a radial air gap. The outer surface 38 of the ring-like support wall 34 of the rotor forms a brake surface for two elevator brakes 40*a*, 40*b*.

Thus, the overall construction of the elevator motor is very flat and very compact and integrated so that only a minimal unused space is left inside the closed area between the motor frame 12 and the rotor 26. With respect to the guide rail 18, it has to be mentioned that it is preferably a T-shaped guide rail with the central vertical member 41 of the guide rail 18 extends in axial direction and where the horizontal member 42 of the guide rail 18 extends in radial direction. The horizontal member 42 of the guide rail 18 has a width w which fits to the width of a recess 44 in the back wall 16 of the motor frame 12. This recess 44 extends radially and goes through the axis of the motor 10. When the motor 10 is fixed to the guide rail 18, the horizontal member 42 of the guide rail 18 with the width w is accommodated within the recess 44 so that the thickness of the back wall 16 does not add up to the thickness of the horizontal member 42 of the guide rail 18 as now the horizontal member 42 of the guide rail 18 is now located within the wall thickness of the back wall 16. Thus, a reduced thickness of the mounted construction of guide rail and elevator motor is obtained.

Figure 3:
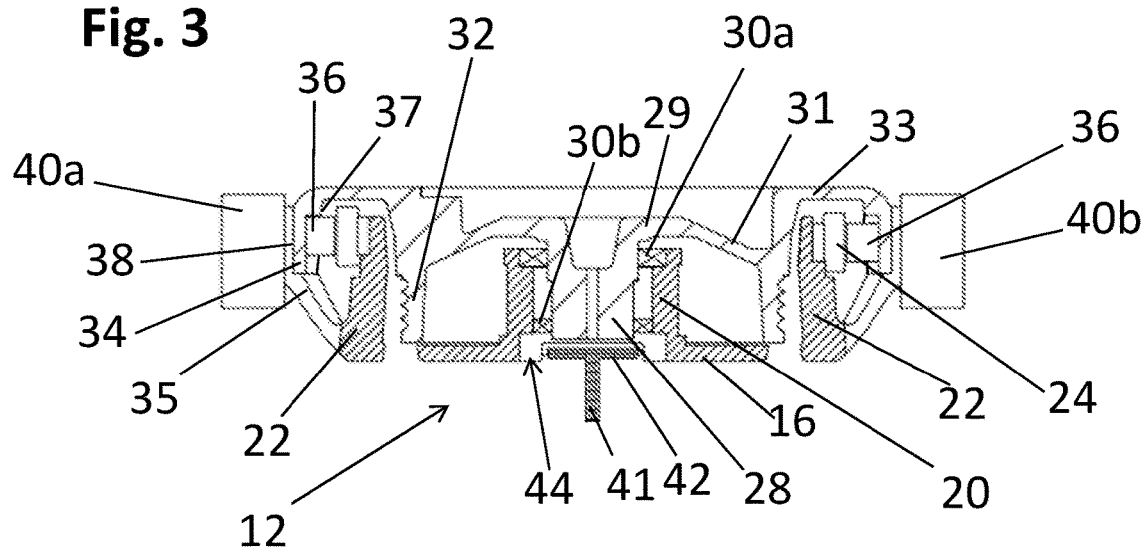
FIG. 3 shows a partly sectioned top view of the motor of FIG. 1.

In FIG. 3, it can clearly be seen that the horizontal member 42 of the T-profile guide rail 18 is within the thickness area of the back wall 16 which reduces the thickness of the complete construction.

FIG. 5 further shows a mounting flange 46 mounted to the guide rail 18 with bolts 14 whereby the mounting flange 46 surrounds and supports the flange 20 of the motor frame 12 preferably via a resilient support material or noise insulating elements 48 which also provides a noise isolation of the elevator motor 10 with respect to the guide rail 18. This reduces the noise in the elevator shaft and thus improves the traveling comfort for the passengers. Furthermore, an upper and a lower mounting shoe 50, 52 is mounted to the guide rail 18 which mounting shoes 50, 52 form-fit with corresponding mounting protrusions 54 located at the upper and lower end of the motor frame 12. Thus, the elevator motor 10 is kept in place on the guide rail 18 and is on the other hand noise-isolated with respect to the guide rail.

The above-mentioned embodiment shall not be restricting for the scope of protection of the invention as it is apparent from the appended patent claims.

LIST OF REFERENCE NUMBERS

10 radial flux permanent magnet elevator motor
12 motor frame—stator frame
14 fastening bolts
16 back wall of the motor frame
18 guide rail
20 flange of the motor frame
22 first wall section of the motor frame
24 stator winding(s)
26 rotor
28 central hub of the rotor
29 first rotor portion
30*a*,*b* bearings between stator flange and rotor hub
31 second rotor portion
32 traction sheave
33 third rotor portion
34 ring-like support wall of the rotor
35 mounting points of the motor frame for the brakes
36 permanent magnets
37 inner surface of the ring-like support wall
38 outer surface of the ring-like support wall
40*a*,*b* elevator brakes
41 horizontal member of T-profile guide rail
42 vertical center member of T-profile guide rail
44 recess in the back wall for accommodating the guide rail
46 mounting flange mounted to the guide rail for supporting the motor on the guide rail
48 resilient support material between the mounting flange and the flange of the motor frame—noise insulating elements
50 upper mounting shoe
52 lower mounting shoe
54 mounting protrusion

The invention claimed is:

1. A radial permanent magnet elevator motor, comprising:
    a motor frame forming a stator frame and having fixing points to be fixed to an elevator guide rail, said motor frame having a back wall facing and/or abutting with the elevator guide rail,
    wherein the back wall includes:
        an axially extending flange protruding in the direction of a rotor of the motor; and
        a recess configured to receive the elevator guide rail,
    wherein the motor frame further comprises at least one axially extending first wall section in a first radial distance from an axis of the motor frame, the first wall section being configured to support a stator winding of the motor and being separate from the axially extending flange,
    wherein the rotor comprises:
        a central hub protruding into the flange of the motor frame, the central hub being rotatively supported within the flange via bearings; and
        a traction sheave and a support wall in a second radial distance from the axis of the motor frame for supporting permanent magnets,
    wherein the second radial distance is larger than the first radial distance, and whereby the stator winding and the permanent magnets form a radial air gap, and
    wherein the traction sheave is positioned between the axially extending flange and the at least one axially extending first wall section in a radial direction and the traction sheave is overlapped by the axially extending flange and the at least one axially extending first wall section in the radial direction.

2. The motor according to claim 1, wherein the motor frame and the rotor each form trough-like cavities having openings facing each other.

3. The motor according to claim 1, wherein the rotor comprises an outer ring like support wall forming a brake surface for at least one elevator brake.

4. The motor according to claim 3, wherein the support wall forms a brake surface for at least one elevator brake on an outer surface thereof.

5. The motor according to claim 1, wherein several wall sections are located at the motor frame in an equidistant spacing.

6. The motor according to claim 1, wherein at least one of the permanent magnets is at least partially embedded into the rotor iron of the rotor.

7. The motor according to claim 6, wherein at least one of the permanent magnets is at least partially embedded into an inner surface of the ring-like support wall.

8. The motor according to claim 6, wherein the permanent magnets are arranged in uniform or approximately uniform angular intervals around the axis of the motor frame in the inner surface fully circumferential of the ring-like support wall.

9. The motor according to claim 1, wherein the thickness of the motor is 20 to 40% of its diameter.

10. The motor according to claim 1, wherein the motor frame comprises mounting points for at least one elevator brake.

11. The motor according to claim 1, wherein the flange extends 5 to 20 cm from the back wall.

12. The motor according to claim 1, wherein the motor frame faces the rotor only from one side facing the guide rail.

13. The motor according to claim 1, wherein the rotor is made from light weight metal.

14. The motor according to claim 1, wherein the hub is born in the flange with two axially spaced apart bearings.

15. The motor according to claim 1, herein the diameter of the traction sheave is smaller than the second diameter.

16. An elevator comprising the motor according to claim 1 and having at least one guide rail and a roping running over the traction sheave for supporting and/or moving an elevator car.

17. The elevator according to claim 16, wherein the motor is mounted to the guide rail with a mourning flange which on one hand is fastened to the guide rail and on the other hand is fixed to the flange of the motor frame.

18. The elevator according to claim 17, wherein the mounting flange, the flange, the traction sheave and the stator winding and the permanent magnets are located in a common vertical plane.

19. A radial permanent magnet elevator motor, comprising:
a motor frame forming a stator frame and having fixing points to be fixed to an elevator guide rail, said motor frame having a back wall facing and/or abutting with the elevator guide rail, said motor frame comprising: an axially extending flange protruding away from the back wall in the direction of a rotor of the motor; and
at least one axially extending first wall section in a first radial distance from an axis of the motor frame, the first wall section being configured to support a stator winding of the motor,
wherein the rotor comprises:
a central hub protruding into the flange of the motor frame, the central hub being rotatively supported within the flange via bearings; and
a traction sheave as well as a ring support wall in a second radial distance from the axis of the motor frame for supporting permanent magnets,
wherein the second radial distance is larger than the first radial distance, and whereby the stator winding and the permanent magnets form a radial air gap, and
wherein the rotor comprises a first rotor portion surrounding the hub and extending radially and a second rotor portion extending at an angle of 10 to 45 degrees in the direction of the back wall of the motor frame, whereby at the outer circumference of the second rotor portion the traction sheave is located.

20. The motor according to claim 19, wherein the rotor has a third rotor portion extending from the traction sheave radially outwards and away from the back wall of the motor frame, at an angle of 45 to 90 degrees from the radial plane, the third rotor portion having a ring-like support wall on an outer rim thereof.

* * * * *